Oct. 3, 1967  P. L. FINELLI  3,344,725
PHOTOGRAPHIC CAMERA WITH BATTERY HOLDER
Filed June 16, 1965  3 Sheets-Sheet 1

INVENTOR.
Patrick L. Finelli
BY
Brown and Mikulka
ATTORNEYS

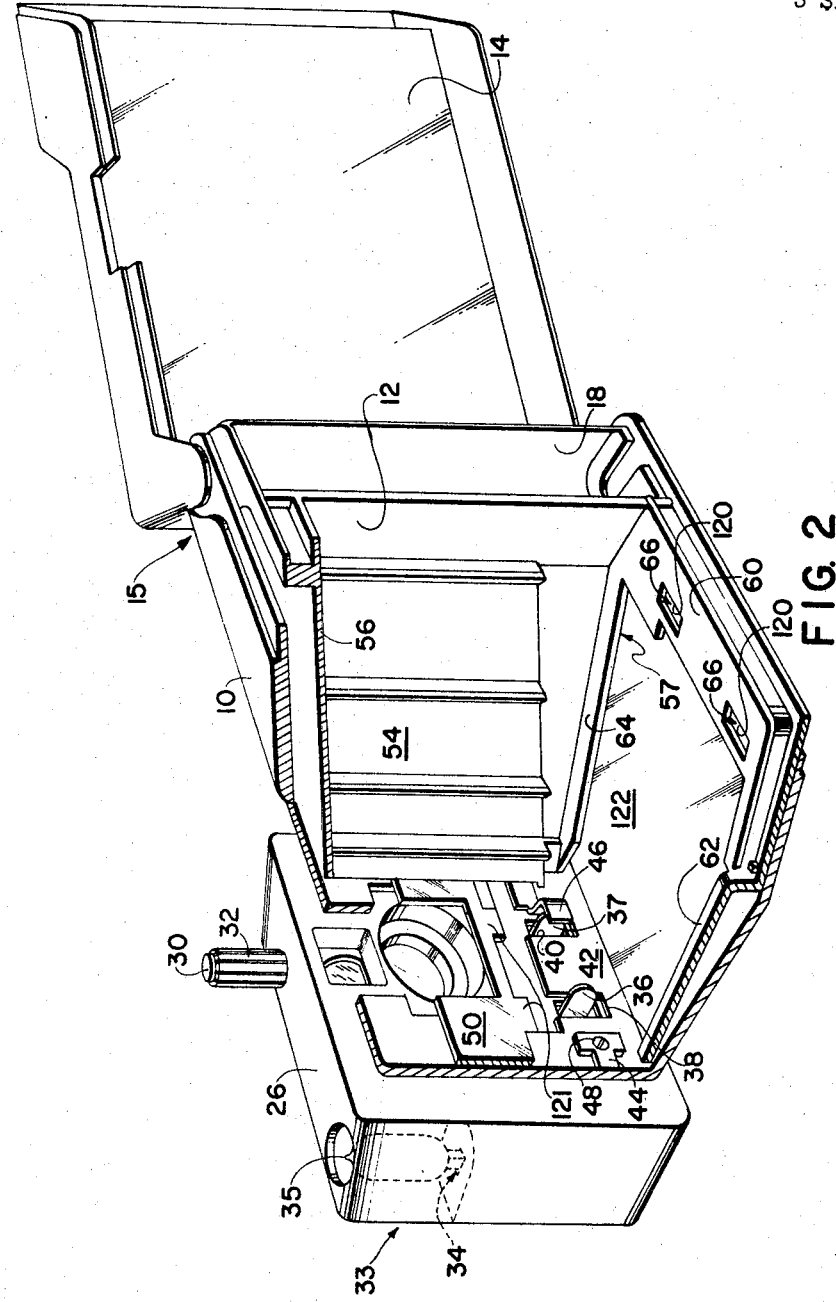

Oct. 3, 1967     P. L. FINELLI     3,344,725
PHOTOGRAPHIC CAMERA WITH BATTERY HOLDER
Filed June 16, 1965     3 Sheets-Sheet 3
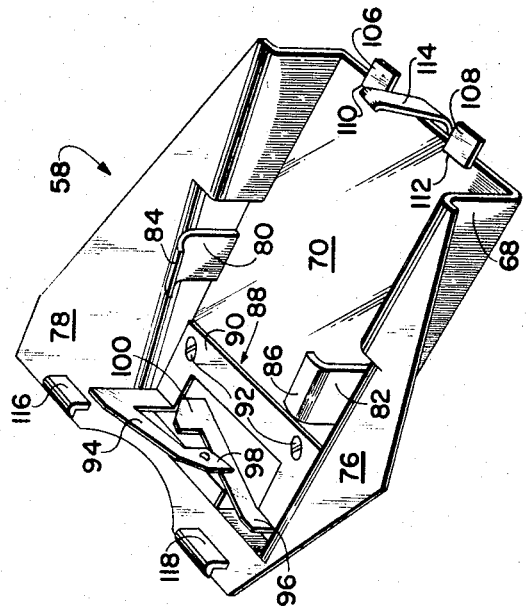
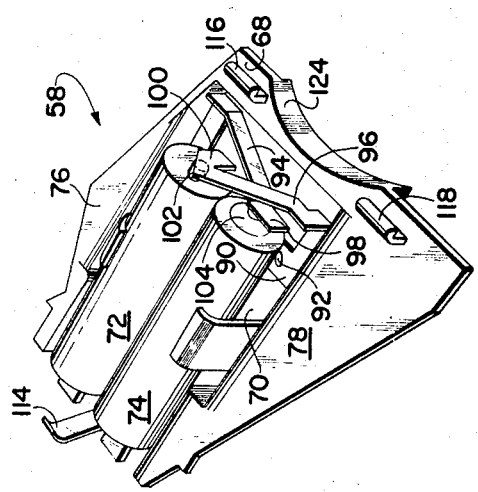
INVENTOR.
Patrick L. Finelli
BY
Brown and Mikulka
ATTORNEYS United States Patent Office 3,344,725
Patented Oct. 3, 1967

3,344,725
PHOTOGRAPHIC CAMERA WITH BATTERY HOLDER
Patrick L. Finelli, Sudbury, Mass., assignor to Polaroid Corporation, Cambridge, Mass., a corporation of Delaware
Filed June 16, 1965, Ser. No. 464,464
5 Claims. (Cl. 95—11)

This invention relates to photographic cameras, and more particularly, to cameras equipped with a holder for supporting batteries within the housing thereof.

Cameras of the hand-carried type are generally designed to be as compact and as lightweight as possible. The advent of built-in battery-powered accessories, such as flashguns and comparison photometers, has been accompanied by a need to locate the batteries on or within the camera in such a way as to protect the batteries and to preserve the compactness and balance of the camera. It is also important that the batteries be easy to remove from and replace within the camera.

Accordingly, it is an object of this invention to provide a camera including a battery holder which does not require any additional space within the camera for the accommodation thereof, but rather which occupies normally unutilized space.

It is another object of this invention to provide a camera including a battery holder from which batteries may be simply and rapidly removed and replaced.

It is another object of this invention to provide a camera having a battery holder which preserves the balance of the camera.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which is indicated in the claims.

For a fuller understanding of the nature and objects of the invention, reference should be had to the following detailed description taken in connection with the accompanying drawings wherein:

FIG. 2 is another perspective view of the camera with the battery holder removed therefrom and the camera housing partly broken away;

FIG. 3 is a perspective view of the battery holder as seen from below with a pair of batteries in place thereon; and FIG. 4 is another perspective view from below of the battery holder, but with the batteries removed.

Figure 1:
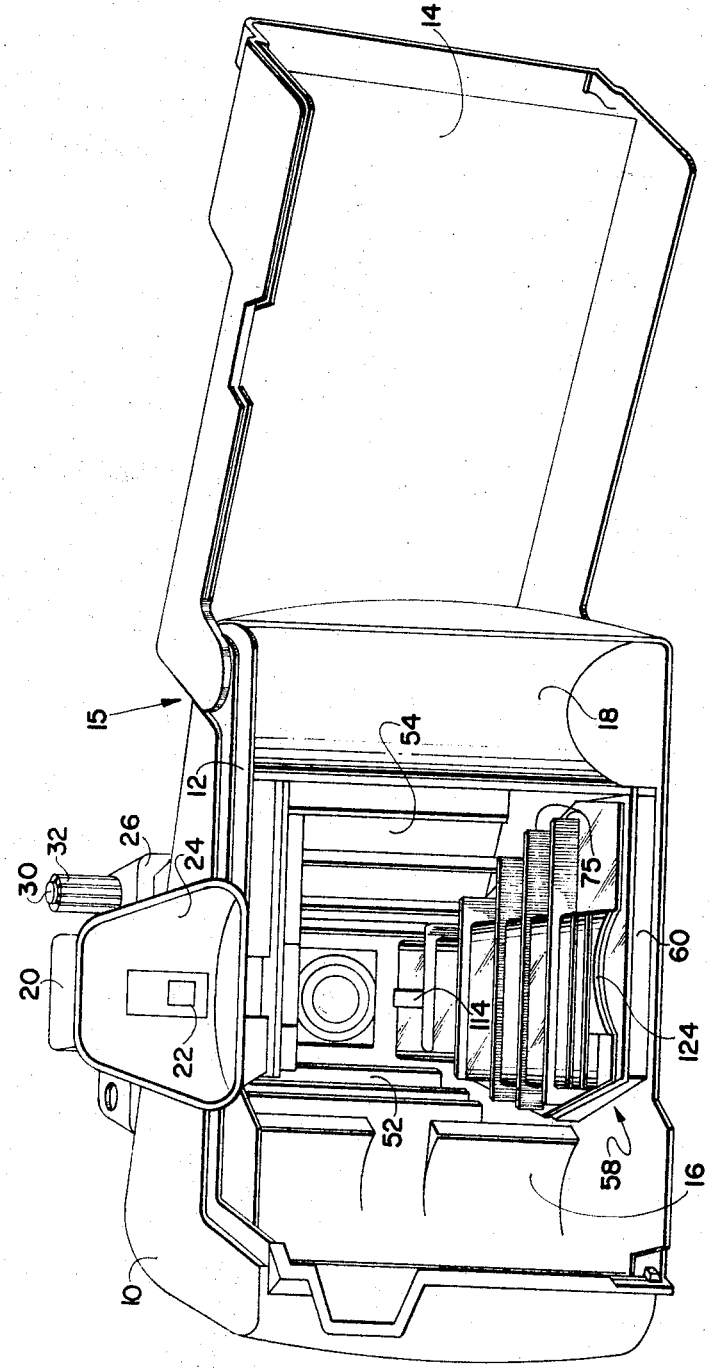
FIGURE 1 is a perspective view of a camera embodying the invention, showing the camera back open and the battery holder in place within the camera.

Referring to the drawings and especially FIGS. 1 and 2, it will be seen that this invention is embodied in a camera having an outer housing 10 and a conforming inner housing 12 ensconced within the outer housing 10. A back 14 is rotatably mounted on the outer housing 10 by means of hinges, one of which is shown at 15. The back 14 cooperates, when closed, with recessed portions 16, 18 formed in the inner housing 12 to define a film-receiving compartment in the rear of the camera.

The camera also includes a viewfinder assembly 20 attached upon the outer housing 10. The assembly 20 has a viewing window 22 and a flexible light shield 24.

Mounted upon the front of the camera housing (see FIG. 2) is a generally box-like unit 26 which includes a shutter (not fully shown), actuated by the depression of a shutter-actuator 30 extending from the top of the unit 26, and a variable exposure aperture controlled by rotation of a sleeve 32 on the shutter-actuator 30.

As stated above, this invention concerns a novel arrangement for supporting within a camera dry cell batteries used to power accessories for the camera. As an example of an electrically powered photographic accessory which can be used on a camera, a flashgun 33 is shown, constituting part of the unit 26. It is evident that a flashgun accessory might easily be made detachable, rather than formed as an inseparable part of the camera, as illustrated at 33. Electrical leads (not shown) form a socket, illustrated in dotted lines in FIG. 2 at 34, for a flashbulb 35 terminate in a pair of terminals 36, 37 extending rearwardly therefrom through a pair of slots 38, 40 in a forward wall 42 of the outer housing 10.

As another example of a battery-powered accessory which can be employed, the camera embodies a comparison-type photometer having a small lamp hidden beneath the viewfinder assembly 20 between the outer housing 10 and the inner housing 12. The electrical leads to the lamp (not shown) are connected to terminal 44 and terminal contact strip 46. Terminal contact strip engages terminal 37 of the unit 26, as shown in FIG. 2. Terminal 44 is electrically connected to terminal 36 within the unit 26 by means of screw 48.

A light-impervious exposure chamber within the camera is defined by wall 42 of the outer housing 10, wall 50 of the inner housing 12, closure 14, a pair of opposed, converging side walls 52, 54 of the inner housing 12, and an upper wall 56 of the inner housing 12. The remaining wall, comprising the floor of the chamber, has a large opening 57 therein. The opening 57 is normally closed by the battery holder 58 constituting the essence of this invention, as will be more fully described hereinafter. The chamber floor is a part of the inner housing 12 and includes a ledge 60 at the rear of the chamber and shelves 62, 64 extending along the side margins thereof (see FIG. 2). The ledge 60 has a pair of openings 66 therein which serve, in a way to be hereinafter described, to assist in retaining the battery holder 58 within the camera.

Referring especially to FIGS. 3 and 4, the battery holder 58 comprises a molded, generally tapered support member 68 having a flat, generally rectangular area 70 upon which a pair of dry cell batteries 72, 74 are retained in side-by-side relationship. On the back of the member 68 are formed a plurality of ribs 75 which serve, as do the similar ribs on the side walls 52, 54 and upper wall 56 of the chamber, to suppress and minimize deleterious reflections within the exposure chamber. The support member 68 has wing-like flanges 76, 78 on opposed sides thereof, one of the functions of which flanges is to guide the battery holder 58 into place during placement of the holder within the camera. A pair of integral, molded spring arms 80, 82 adjacent the flanges 76, 78 and on opposed sides of the flat area 70 have curved end portions 84 and 86, respectively, extending over the flat area 70 which function to grip and securely retain the batteries 72, 74 upon the support member 68. Whereas the spring arms 80, 82 have been shown as being formed integrally with the support member 68, it is evident that they might be formed from a separate material and attached to the support member 68, and also that they might assume other obvious configurations capable of performing the necessary retention of the batteries 72, 74 upon the member 68.

In the illustrated embodiment of the invention the batteries 72, 74 are connected in series, thus requiring that the negative terminal of one battery be connected to the positive terminal of the other battery. This is accomplished by orienting the batteries 72, 74 in opposite directions on the member 68 and employing a contact means 88 composed of an electrically conductive material and comprising a base strip 90 secured by screws 92 to the support member 68. The contact means 88 includes contact arms 94, 96, one arm extending inwardly from each end of the base strip 90. Contact arm 94 has a tip 98 extending past the tip 100 of the other contact arm 96 into engagement with the terminal 104 of battery 74 on the opposed side of the support member 68. Likewise the tip 100 of contact arm 96 extends across the member 68 into engagement with terminal 102 of battery 72. By this arrangement the contact arms 94, 96 have a greater length than would be possible if the arms contacted the terminal of the closest battery; the longer arm provides a greater degree of resilient movement and thus a more stable engagement with the battery terminal. In addition, with this arrangement the batteries "float" independently on the support member 68 and thus the criticality of certain tolerances within the camera is lessened.

At the forward end of the support member 68 is a pair of guide tabs 106, 108 formed integrally with the support member 68. As will be more fully described hereinafter, the forward end of these guide tabs serve to guide and position the battery holder during placement of the holder in the camera, and also assist in securing the holder within the camera. The rear end of each of the tabs 106, 108 has an abutting surface 110 and 112, respectively, which acts as a stop for the batteries 72, 74 to prevent the bias imposed by the resilient contact arms 94, 96 from dislodging the batteries 72, 74 from the battery holder 58.

A leaf spring 114 is attached or formed integrally with the forward end of the support member 68. The spring 114 functions to impose bias on the battery holder 58 when the holder is in place within the camera, and thus help to secure the holder. A pair of integral latch projections 116, 118 on the rear of the support member 68 are designed to secure the battery holder 58 within the camera by retentively engaging edges 120 of the openings 66 in the ledge 60, being held securely in the openings 66 by the bias imposed by leaf spring 114.

The battery holder 58 and the batteries 72, 74 may be quickly and easily placed securely within the camera as follows. The support member 68 is grasped at the rear thereof and placed within the light-impervious chamber in the camera, the shelves 62, 64 acting to support and guide the flanges 76, 78 on the battery holder 58 as the holder is pushed forwardly into the chamber. As the battery holder 58 approaches the forward end of the chamber, the guide tabs 106, 108 are received beneath projections 121 on the lower edge of wall 50 of the inner housing 12, serving to position and help secure the holder within the camera. At this time the leaf spring 114 engages the wall 42, imposing a rearward bias on the holder. As the battery holder 58 attains its forwardmost position, a slight downward pressure on the rear end of the support member 68 causes the latch projections 116, 118 on the support member 68 to snap securely into the openings 66 in the ledge 60 under the influence of spring 114.

It is evident that with the battery holder 58 in place, the support member 68 forms the floor of the light-impervious chamber and the batteries 72, 74 are disposed between the support member 68 and a bottom wall 122 of the outer housing 10 in a pocket which would not otherwise be utilized. Thus by this invention camera compactness need not be sacrificed in order to accommodate batteries within the camera. Also, with the batteries thus located, there is no danger of their being dislodged from the camera or damaged, as is possible with certain prior art arrangements.

To facilitate removal of the battery holder 58, a recessed thumb grip portion 124 is formed in the support member 68. The battery holder 58 can be easily released by merely inserting the thumb in the thumb grip portion 124 and pushing the holder forward slightly against bias of the leaf spring 114 while lifting the rear end of the support member 68 to free the latch projections from the openings 66 in the ledge 60. The holder can then be easily withdrawn from the chamber.

Since certain changes may be made in the above apparatus without departing from the scope of the invention herein involved, it is intended that all matter contained in the above description shall be interpreted as illustrative and not in a limiting sense.

What is claimed is:

1. A photographic camera including a film-receiving compartment and means defining an exposure aperture, said camera comprising:
   (a) housing means, said housing means defining a light-impervious exposure chamber between the film-receiving compartment and the exposure aperture, said chamber having sides, one side including an outer wall and an inner wall defining a battery pocket therebetween, said inner wall having an opening therein;
   (b) a battery holder comprising:
       a support member for holding a battery, said member closing said opening in said inner wall to form at least a portion of said inner wall when said battery holder is in place within the camera,
       means on said support member for retaining a battery on said member,
       contact means on said member comprising a flexible contact arm for engaging a terminal of said battery, and
       stop means on said support member for limiting movement of said battery caused by the bias imposed by said contact arm; and
   (c) terminals for terminating electrical leads to an electrically powered accessory, said terminals being arranged for electrical connection with the battery supported in said pocket on said battery holder.

2. A photographic camera including a film-receiving compartment and means defining an exposure aperture, said camera comprising:
   (a) housing means, said housing means defining a light-impervious exposure chamber between the film-receiving compartment and the exposure aperture, said chamber having a forward end and sides, one side including an outer wall and an inner wall defining a battery pocket therebetween, said inner wall having first and second openings therein;
   (b) a battery holder comprising:
       a support member for holding a battery, said member closing said first opening in said inner wall to form at least a portion of said inner wall when said battery holder is in place within the camera, said member having ribs extending into said chamber to minimize deleterious reflections in said chamber,
       means on said support member for retaining said battery on said member,
       a leaf spring extending from said member, and
       a latch projection on said member received in said second opening in said inner wall when said support member is in place within the camera, said leaf spring engaging said forward end of said chamber and biasing said holder rearwardly to assist in retaining said projection in said second opening; and
   (c) terminals for terminating electrical leads to an electrically powered accessory, said terminals extending into said pocket for electrical connection with the battery supported in said pocket on said battery holder.

3. A photographic camera including a film-receiving compartment and means defining an exposure aperture, said camera comprising:
   (a) housing means, said housing means defining a light-impervious exposure chamber between the film-receiving compartment and the exposure aperture, said chamber having a forward end and sides, one side including an outer wall and an inner wall defining a battery pocket therebetween, said inner wall having first and second openings therein and a pair of shelves along opposed sides of said first opening;
(b) a battery holder comprising:
  a support member for holding a battery, said member closing said first opening in said inner wall to form at least a portion of said inner wall when said battery holder is in place within the camera, said member having flanges on opposed sides thereof, said shelves suporting and guiding said flanges during placement of said battery holder in the camera,
  means on said support member for retaining said battery on said member,
  a leaf spring extending from said member, and
  a latch projection on said member received in said second opening in said inner wall when said support member is in place within the camera, said leaf spring engaging said forward end of said chamber and biasing said holder rearwardly to assist in retaining said projection in said second opening; and
(c) terminals for terminating electrical leads to an electrically powered accessory, said terminals extending into said pocket for electrical connection with the battery supported in said pocket on said battery holder.

4. A photographic camera including a film-receiving compartment and means defining an exposure aperture, said camera comprising:
(a) housing means, said housing means defining a light-impervious exposure chamber between the film-receiving compartment and the exposure aperture, said chamber having a forward end and sides, one side including an outer wall and an inner wall defining a battery pocket therebetween, said inner wall having first and second openings therein;
(b) a battery holder for holding a pair of batteries in side-by-side relationship in said battery pocket, comprising:
  a support member for holding said batteries, said member closing said first opening in said inner wall to form at least a portion of said inner wall when said battery holder is in place within the camera,
  means on said support member for retaining said batteries on said member,
  contact means on said member comprising a base strip and a flexible contact arm extending from each end of said strip, the tip of each arm extending past the tip of the other arm into engagement with a terminal of the battery on the opposed side of said member,
  a leaf spring extending from said member, and
  a latch projection on said member received in said second opening in said inner wall when said support member is in place within the camera, said leaf spring engaging said forward end of said chamber and biasing said holder rearwardly to assist in retaining said projection in said second opening; and
(c) a pair of terminals for terminating electrical leads to an electrically powered accessory, said terminals extending through said forward end of said chamber and into said pocket for electrical connection with terminals of the batteries supported in said pocket on said battery holder.

5. A photographic camera including a film-receiving compartment and means defining an exposure chamber, said camera comprising:

(a) an outer housing;
(b) an inner housing within said outer housing, said inner housing defining a light-impervious exposure chamber between the exposure aperture and the film-receiving compartment, said chamber including a forward end and walls, said forward end having means projecting therefrom, one wall of said walls having first and second openings therein and a pair of shelves along opposed sides of said first opening, said one wall and said outer housing defining a battery pocket therebetween;
(c) a battery holder for holding a pair of batteries in side-by-side relationship in said battery pocket, comprising:
  a generally tapered support member for holding said batteries, said member closing said first opening in said one wall to form at least a portion of said one wall when said battery holder is in place within the camera, said member having flanges on opposed sides thereof, said shelves supporting and guiding said flanges during placement of said battery holder in the camera,
  a pair of spring arms integral with said member, each of said arms having a curved end portion for retaining a battery on said member,
  a guide tab integral with said support member, said tab being received beneath said means projecting from said forward end of said chamber during placement of said holder in the camera, said tab and said projecting means serving to guide said holder into place and to secure said holder when it is in place,
  a leaf spring extending from said member,
  a latch projection on said member received in said second opening in said one wall when said support member is in place within the camera, said leaf spring engaging said forward end of said chamber and biasing said holder rearwardly to assist in retaining said projection in said second opening,
  contact means on said member comprising a base strip and a flexible contact arm extending from each end of said strip, the tip of each arm extending past the tip of the other arm into engagement with a terminal of the battery on the opposed side of said member, and
  stop means on said member for limiting the movement of the batteries in response to the bias imposed by said contact arms; and
(d) a pair of terminals for terminating electrical leads to an electrically powered accessory, said terminals extending through said forward end of said chamber and into said pocket for electrical connection with terminals of the batteries supported in said pocket on said battery holder.

References Cited
UNITED STATES PATENTS

| | | | |
|---|---|---|---|
| 2,305,293 | 12/1942 | Kuppenbender et al. | 95—11.5 |
| 2,835,176 | 5/1958 | Land | 95—11 XR |
| 3,001,461 | 9/1961 | Irwin | 95—11.5 |
| 3,049,611 | 8/1962 | Kluge | 240—1.3 |

NORTON ANSHER, *Primary Examiner.*

F. L. BRAUN, *Assistant Examiner.*